United States Patent [19]
Obukata et al.

[11] Patent Number: 5,609,472
[45] Date of Patent: Mar. 11, 1997

[54] ROTOR BLADE FOR A ROTARY-WING AIRCRAFT

[75] Inventors: Masahiro Obukata; Masaaki Nakadate, both of Utsunomiya, Japan

[73] Assignee: Fuji Jukogyo Kabushiki Kaisha, Tokyo, Japan

[21] Appl. No.: 509,854

[22] Filed: Aug. 1, 1995

[30] Foreign Application Priority Data

Aug. 2, 1994 [JP] Japan ..................................... 6-181555

[51] Int. Cl.$^6$ ................................................. B64C 27/467
[52] U.S. Cl. ........................................ 416/223 R; 416/242
[58] Field of Search ............................... 416/223 R, 242; 244/35 R

[56] References Cited

U.S. PATENT DOCUMENTS

| | | | |
|---|---|---|---|
| 4,412,664 | 11/1983 | Noonan | 416/223 R |
| 4,459,083 | 7/1984 | Bingham . | |
| 4,776,531 | 10/1988 | Noonan | 416/223 R |
| 5,344,102 | 9/1994 | Nakadate et al. | 416/223 R |

FOREIGN PATENT DOCUMENTS

| | | |
|---|---|---|
| 0048649 | 3/1982 | European Pat. Off. . |
| 262071 | 3/1988 | European Pat. Off. . |
| 517467 | 12/1992 | European Pat. Off. . |
| 2059373 | 4/1981 | United Kingdom . |
| 2138374 | 10/1984 | United Kingdom . |

*Primary Examiner*—James Larson
*Attorney, Agent, or Firm*—Beveridge, DeGrandi, Weilacher & Young, LLP

[57] ABSTRACT

A rotor blade for a rotary-wing aircraft, of an airfoil section has a basic blade thickness at 12% chord length, a portion of an increased blade thickness between the leading edge and a point corresponding to about 90% chord length, a maximum blade thickness at a position shifted backward, a curvature distribution concentrated on the middle portion thereof, and a portion contiguous with the trailing edge and cambered. The drag coefficient of the airfoil section is small when the Mach number is about 0.6 and the lift coefficient is about 0.6, and the airfoil section has a large maximum lift coefficient and a large zero-lift drag divergence Mach number, and generates a small pitching moment.

5 Claims, 9 Drawing Sheets

PRIOR ART

ROTOR BLADE FOR A ROTARY-WING AIRCRAFT

BACKGROUND OF THE INVENTION

1. Field of the Invention

The present invention relates to a rotor blade for a rotary-wing aircraft and, more particularly, to an airfoil section of a rotor blade for a rotary-wing aircraft, having a small drag coefficient in a state where the Mach number is small.

2. Description of the Related Art

Airfoil sections developed by NACA, i.e., the former NASA (National Aeronautics and Space Administration) of USA, are used widely. Airfoil sections NACA0012 and NACA23012 are representative ones among those developed by NACA The applicant of the present patent application proposed the airfoil sections with improved performance in the U.S. Pat. No. 5,344,102. Each of previously proposed airfoil sections has a maximum lift coefficient $C_{1max}$ and a zero-lift drag divergence Mach number $M_{dd}$, which are higher than those of the NACA's airfoil sections. Shown in FIGS. 11(A), 11(B), 11(C), 11(D) and 11(E) are airfoil sections U896H-10, U896H-10UR, U896H-08, U896H-09 and U896H-12 proposed in the U.S. Pat. No. 5,344,102. Since the upper line and the lower line of each of these airfoil sections are substantially symmetrical in a range between coordinates corresponding to about 30% chord length and coordinates corresponding to about 90% chord length, the nose-down pitching moment about the airfoil section, with intrinsic characteristics to cambered airfoil sections, is comparatively small. Accordingly, these airfoil sections can reduce the load on the pitch angle changing mechanism of a rotary-wing aircraft and vibrations due to the variation of the pitching moment during the rotation of the rotary wing.

Figure 12:
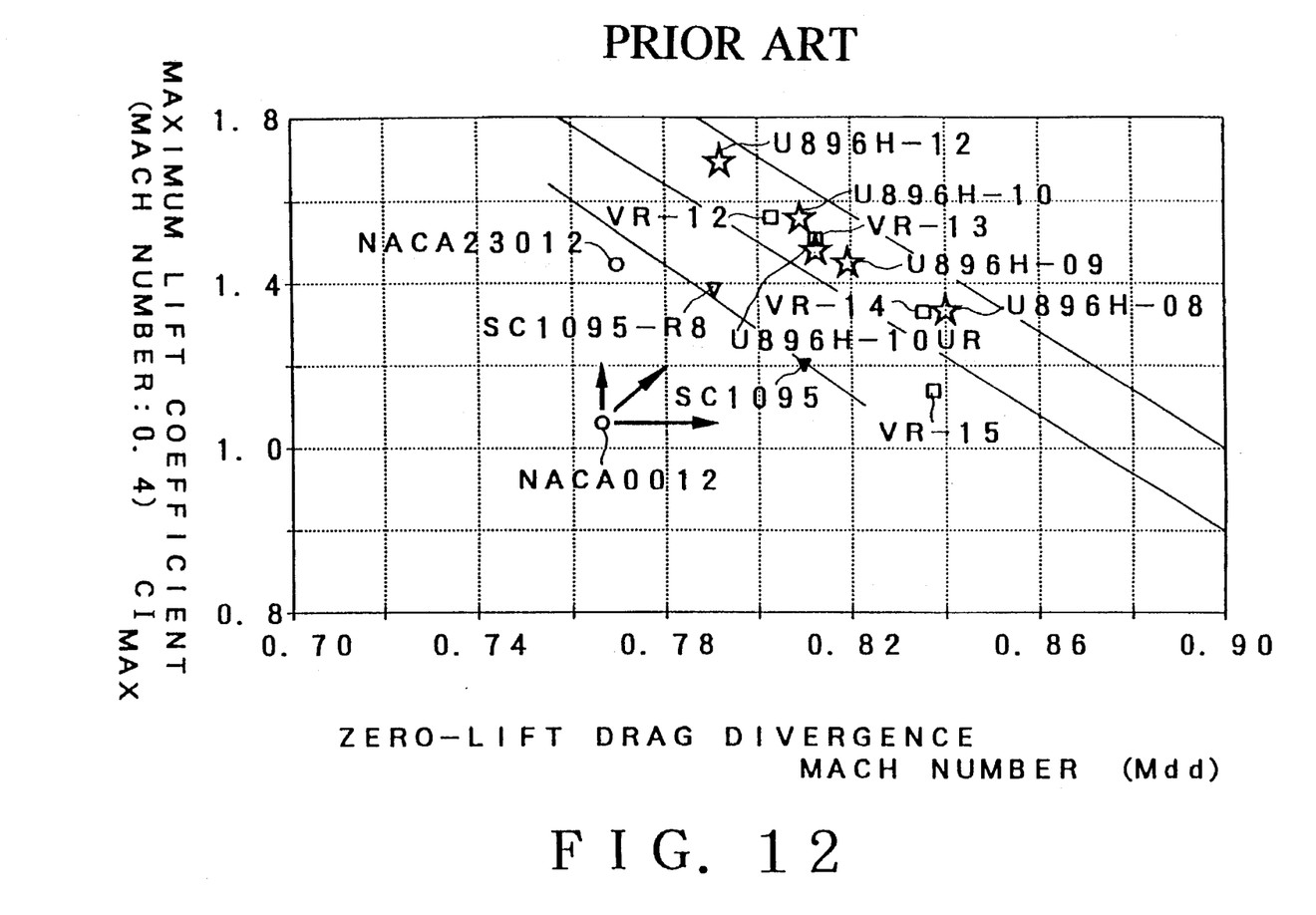
FIG. 12 is a graph showing the performance of airfoil sections, in which maximum lift coefficient $C_{max}$ is measured upward on the vertical axis and zero-lift drag divergence Mach number $M_{dd}$ is measured to the right on the horizontal axis.

FIG. 12 shows the performance of NACA0012, NACA23012 and the airfoil sections proposed in the U.S. Pat. No. 5,344,102, in which the maximum lift coefficient $C_{1max}$ at a Mach number of 0.4 is indicated at a higher point along the vertical axis and the zero-lift drag divergence Mach number $M_{dd}$ is measured to the right position along the horizontal axis. As is obvious from FIG. 12, the maximum lift coefficients $C_{1max}$ and the zero-lift drag divergence Mach numbers $M_{dd}$ of the airfoil sections of the U.S. Pat. No. 5,344,102 are larger than those of NACA0012 and NACA23012, which indicates the excellent performance of the airfoil sections proposed in the U.S. Pat. No. 5,344,102.

An inner wing portion, i.e., the base portion, of the rotor blade for the rotary-wing aircraft and an outer wing portion, i.e., an wing tip portion, of the same undergo different airflow conditions, respectively, during operation. Therefore, it is inappropriate, in some cases, to apply the same airfoil sections previously proposed by the applicant of the present patent application to all the sections of rotor blades. The airspeed of the inner part of a rotor blade is lower than that of the outer part and the working Mach number of the inner part is comparatively small. Therefore, requirements of the inner part of a rotor blade concerning drag divergence Mach number are not very severe. Generally, the maximum lift coefficient $C_{1max}$ of an airfoil section is comparatively large in a small Mach number range, the maximum lift coefficient $C_{1max}$ of the inner part need not be very large. Therefore, the improvement of the drag characteristic of the inner part of a rotor blade under a hovering flight condition, where Mach number is about 0.6 and lift coefficient is about 0.6, is more important than increasing the maximum lift coefficient and the drag divergence Mach number, and the reduction of the drag coefficient under such airflow conditions is required.

Although the airfoil sections proposed in the U.S. Pat. No. 5,344,102 each have a large maximum lift coefficient $C_{1max}$ or a large zero-lift drag divergence Mach number $M_{dd}$, the drag coefficient shows a tendency to increase when the lift coefficient is 0.6 or above and the Mach number is about 0.6, and the airfoil section of the inner wing portion of the rotor blade leaves room for improvement.

SUMMARY OF THE INVENTION

Accordingly, it is an object of the present invention to provide a rotor blade for a rotary-wing aircraft, having a sectional shape of a small drag coefficient, a large maximum lift coefficient, a large drag divergence Mach number and a small pitching moment when the Mach number is about 0.6 and the lift coefficient is about 0.6.

With this object in view, the present invention provides a rotor blade for a rotary-wing aircraft, designed on the basis of the airfoil section U896H-10 disclosed in the U.S. Pat. No. 5,344,102, developed through the optimization of the coordinates of the upper surface of the airfoil section by increasing the blade thickness, shifting the position of the maximum blade thickness backward, concentrating the curvature distribution on the middle part, and curving a portion contiguous with the trailing edge in an upper concave shape.

Basically, the coordinates of the lower surface of the airfoil section of the present invention are the same as those of the airfoil section U896H-10. Therefore, the zero-lift drag divergence Mach number is comparatively large. Since the coordinates of the upper leading edge of the airfoil section of the present invention are basically the same as those of the airfoil section U896H-10, the maximum lift coefficient of the airfoil section of the present invention is comparatively large.

Since the coordinates of the upper surface of the airfoil section are determined so that, as compared with the airfoil section U896H-10, the blade thickness is increased, the position of the maximum blade thickness is shifted backward and the curvature distribution is concentrated on the middle portion, the peak of negative pressure in the vicinity of the leading edge is reduced and the drag that acts on the rotor blade when the Mach number is about 0.6 and the lift coefficient is about 0.6 can be reduced. Since the coordinates of the upper surface of the airfoil section are determined so that curvatures in a portion contiguous with the trailing edge are small, and a portion contiguous with the trailing edge is cambered, downward pitching moment is reduced.

The combined effect of the foregoing improvements provides a rotor blade for a rotary-wing aircraft, subject to a small drag when the Mach number is about 0.6 and the lift coefficient is about 0.6 and having a small nose-down pitching moment as well as a comparatively large maximum lift coefficient and a comparatively large drag divergence Mach number.

Preferred embodiments of the present invention will become understood from the following detailed description referring to the accompanying drawings.

DESCRIPTION OF THE PREFERRED EMBODIMENTS

A feature of the present invention resides in a sectional shape of a rotor blade for a rotary-wing aircraft. An outer wing portion and the inner wing portion of the rotor blade of a rotary-wing aircraft are exposed to different airflow conditions, respectively. Requirements of performance of the airfoil section of the rotor blade for the rotary-wing aircraft will be generally described prior to the description of the preferred embodiments of the present invention.

Figure 1:
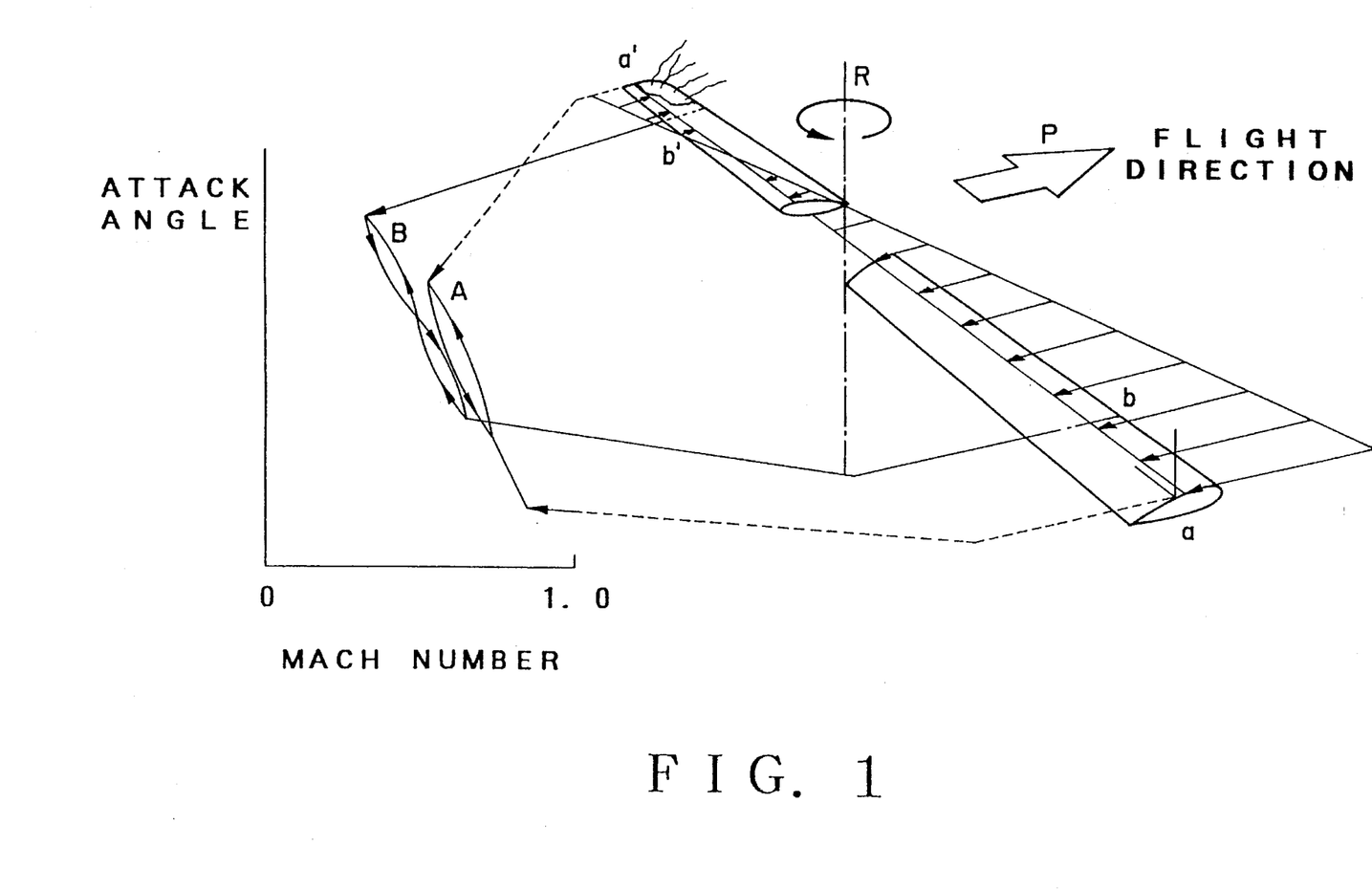
FIG. 1 is a diagrammatic view of assistance in explaining the relation between the attack angle and the Mach number of an airflow acting on the outer part and the inner part of a rotor blade of a rotary-wing aircraft while the rotary-wing aircraft is in a forward flight.

Referring to FIG. 1 showing the relation between the attack angle and the Mach number of an airflow actually acting on an outer wing portion and an inner wing portion of a rotor blade of a rotary-wing aircraft while the rotary-wing aircraft is in a forward flight, the arrow P indicates the flight direction of the rotary-wing aircraft, the arrow R indicates the turning direction of the rotor blade, a curve A indicates the variation of the relation with time between the attack angle and the Mach number of airflows acting on an outer wing portion of the rotor blade moving between positions a and a', and a curve B indicates the variation with time of the relation between the attack angle and the Mach number of airflows acting on an inner wing portion of the rotor blade moving between positions b and b'.

As indicated by the curves A and B, the airspeed is high when the outer wing portion is at the position a and the inner wing portion is at the position b when the rotor blade is moving in the flight direction P, and the airspeed is low when the outer wing portion is at the position a' and the inner wing portion is at the position b' when the rotor blade is moving in the direction opposite to the flight direction P, because the rotary wing turns in the rotational direction R. The attack angle must be reduced when the outer wing portion and the inner part of the rotor blade are at the positions a and b where the airspeed is high, because a high dynamic pressure acts on the rotor blade. The attack angle must be increased when the outer wing portion and the inner wing portion of the rotor blade are at the positions a' and b' where the airspeed is low, because a low dynamic pressure acts on the rotor blade. That is, the airfoil section must have a large drag divergence Mach number to avoid the increase of drag due to a high Mach number under an airflow condition where the airspeed is high and the attack angle is small, whereas the airfoil section must have a large maximum lift coefficient to avoid stalling due to a large attack angle under an airflow condition where the airspeed is low and the attack angle is large.

Figure 2:
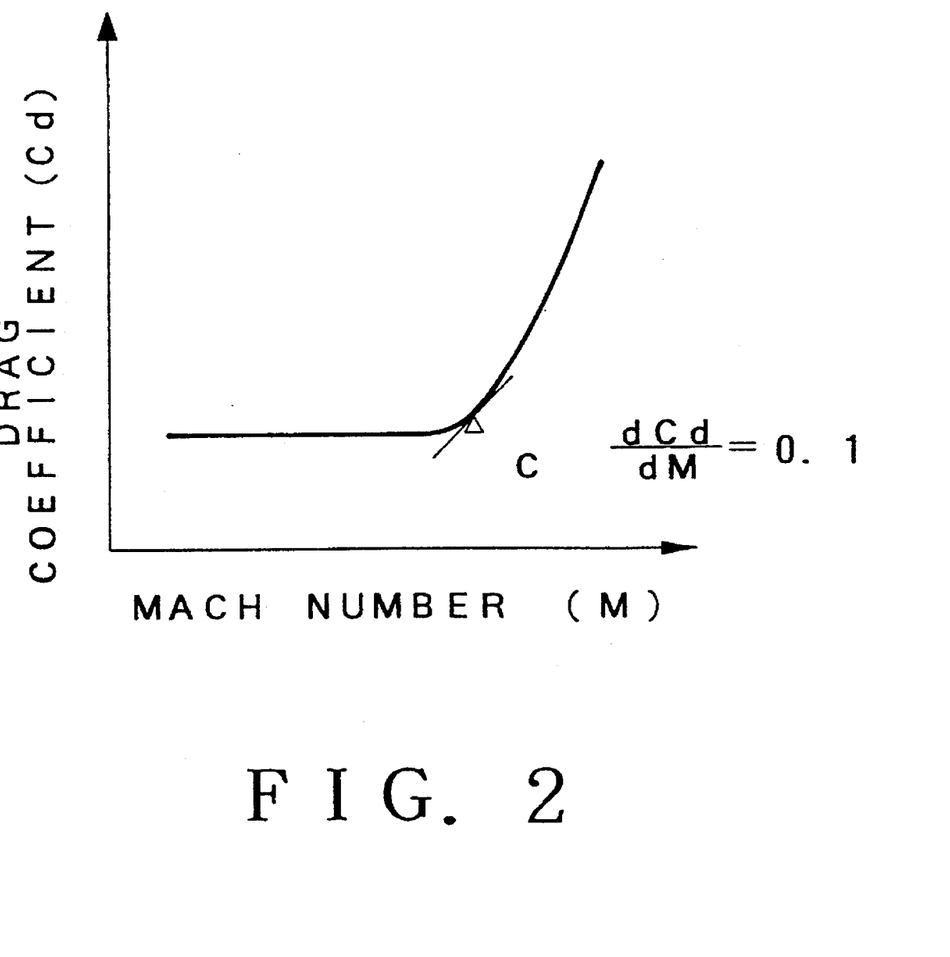
FIG. 2 is a graph showing the variation of drag coefficient with Mach number.

Drag divergence Mach number is a predetermined Mach number at which the drag coefficient of the rotor blade starts to increase sharply when the airspeed increases beyond the predetermined Mach number as shown in FIG. 2. More strictly, the drag divergence Mach number is defined as the Mach number corresponding to a point C where the ratio $dC_d/dM=0.1$, where $C_d$ is drag coefficient and M is Mach number.

Figure 3:
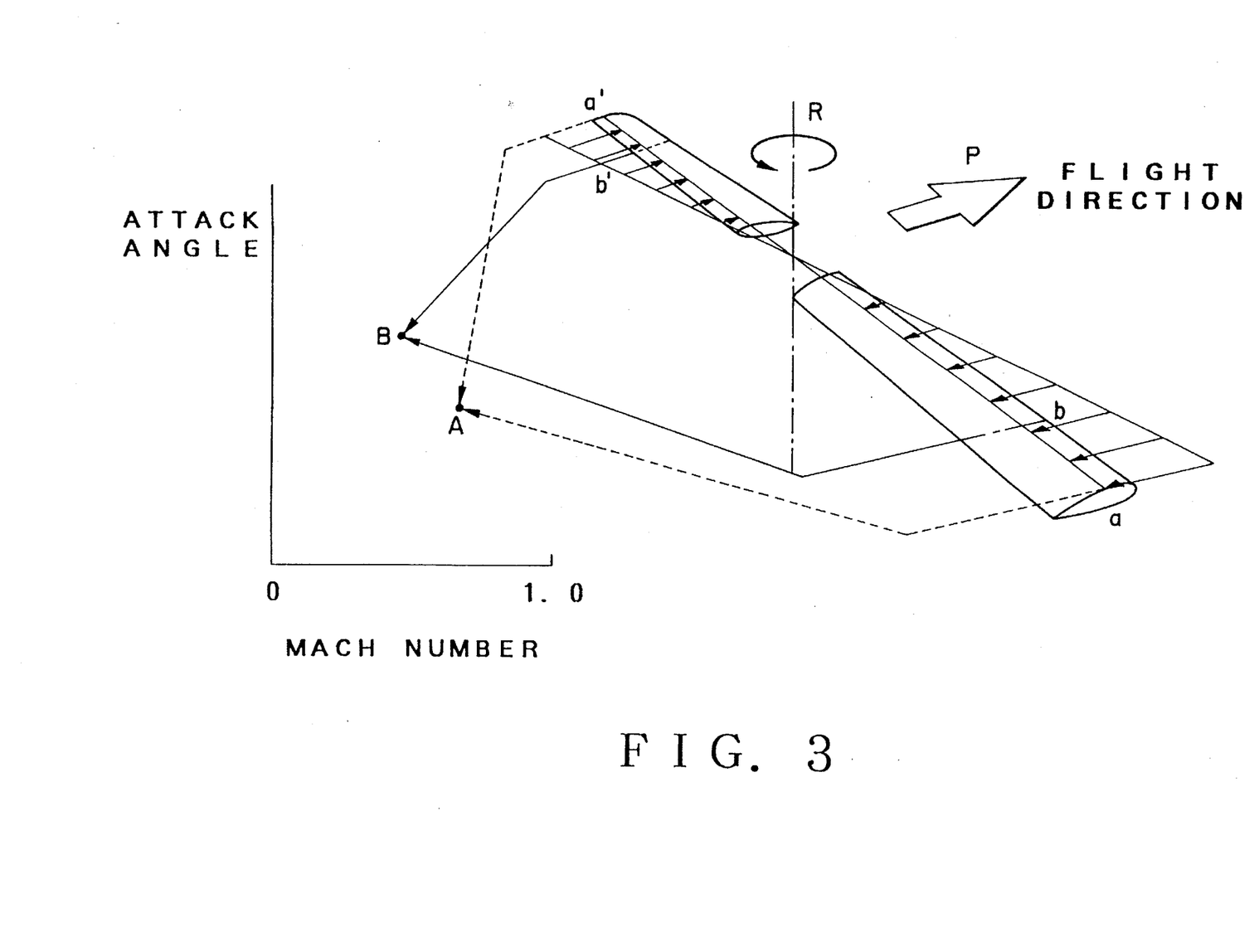
FIG. 3 is a diagrammatic view of assistance in explaining the relation between the attack angle and the Mach number of an airflow acting on an outer part and an inner part of a rotor blade of a rotary-wing aircraft while the rotary-wing aircraft is in a hovering flight.

Referring to FIG. 3 showing the relation between the attack angle and the Mach number of airflows actually acting on an outer wing portion and an inner wing portion of a rotor blade of a rotary-wing aircraft while the rotary-wing aircraft is in a hovering flight, in which the forward flight speed is zero, the arrow R indicates the rotational direction of the rotor blade, a point A indicates the relation between the attack angle and the Mach number of airflows acting on an outer part of the rotor blade moving between positions a and a', and a point B indicates the relation between the attack angle and the Mach number of airflows acting on an inner part of the rotor blade moving between positions b and b'.

While the rotary-wind aircraft is in a hovering flight, the relation between the attack angle and the Mach number do not vary with time, differing from the relation between the same while the rotary-wing aircraft is in a forward flight. Therefore, drags acting on different radial positions on the rotor blade which are exposed to different airflows, respectively, must be reduced to improve the hovering performance. The pitching moment of the rotor blade of a rotary-wing aircraft must be small to reduce vibrations due to the variation of the pitching moment and to reduce load on the pitch angle changing mechanism.

The required performance of the airfoil section of an inner wing portion of a rotor blade for a rotary-wing aircraft will be described hereinafter. As is obvious from FIG. 1, the airspeed of the inner wing portion of the rotor blade is lower than that of the outer wing portion of the same while the rotary-wing aircraft is in a forward flight and hence requirements concerning drag divergence Mach number $M_{dd}$ are not very severe. Since the maximum lift coefficient $C_{1max}$ is large when the Mach number is small, requirements concerning the maximum lift coefficient $C_{1max}$ are not very important. Therefore, the drag characteristic of the sectional shape of the inner wing portion of the rotor blade is important under an airflow condition for a hovering flight where the Mach number is about 0.6 and the lift coefficient is about 0.6, and the drag coefficient of the sectional shape must be small under such an airflow condition.

Figure 4:
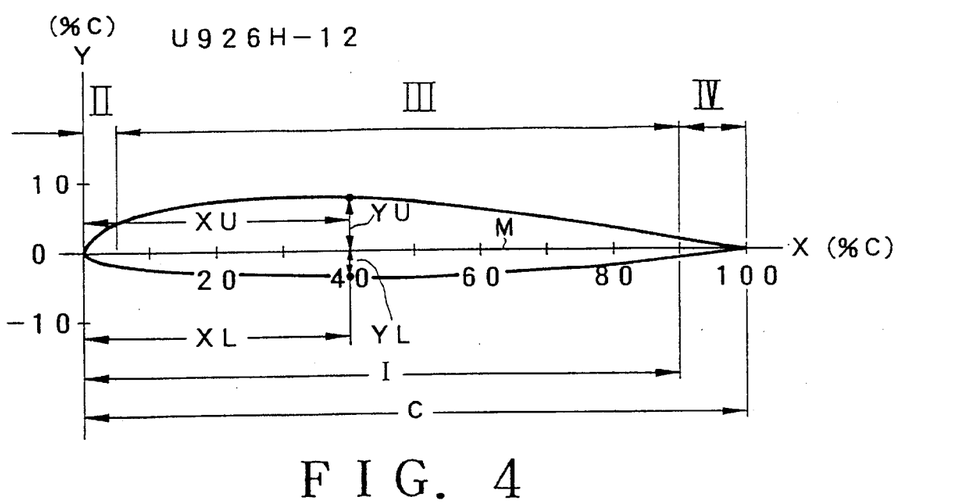
FIG. 4 is a graph showing the airfoil section of a rotor blade in a first embodiment according to the present invention.

FIG. 4 shows a sectional shape of a rotor blade in a first embodiment according to the present invention for a rotary-wing aircraft, of an airfoil section U926H-12. The sectional shape of the rotor blade of the airfoil section U926H-12 having a basic blade thickness of 12% chord length from the leading edge to a point at a 100% chord length is represented by coordinates tabulated in Table 1.

As shown in FIG. 4, $X_U$ and $X_L$ represents horizontal distances from the leading edge of the airfoil section along the chord, C designates the chord length of the airfoil section, $Y_U$ represents a vertical distance of a point on the upper surface from the chord and $Y_L$ represents a vertical distance of a point on the lower surface from the chord.

The shape of a portion of the lower surface of the airfoil section U926H-12 in a range I (FIG. 4) is basically the same as that of the corresponding portion of the lower surface of the airfoil section U896H-10 previously proposed by the applicant of the present patent application in the U.S. Pat. No. 5,344,102, so that a comparatively large zero-lift drag divergence Mach number is secured. The shape of the portion of the upper surface in a range III (FIG. 4) reduces the peak of negative pressure on the leading edge when the Mach number is about 0.6 and the lift coefficient is about 0.6, and reduces the drag when the Mach number is about 0.6 and the lift coefficient is about 0.6, because, as compared with the airfoil section U896H-10, the airfoil section of the rotor blade in this embodiment has an increased blade thickness, the maximum blade thickness at a position shifted backward and a curvature distribution concentrated on a range between the leading edge and the middle portion. Since portions of the upper line near the trailing edge in the range III (FIG. 4) have small curvatures and a portion contiguous with the trailing edge in a range IV (FIG. 4) is cambered, the down pitching moment is small.

Figure 5:
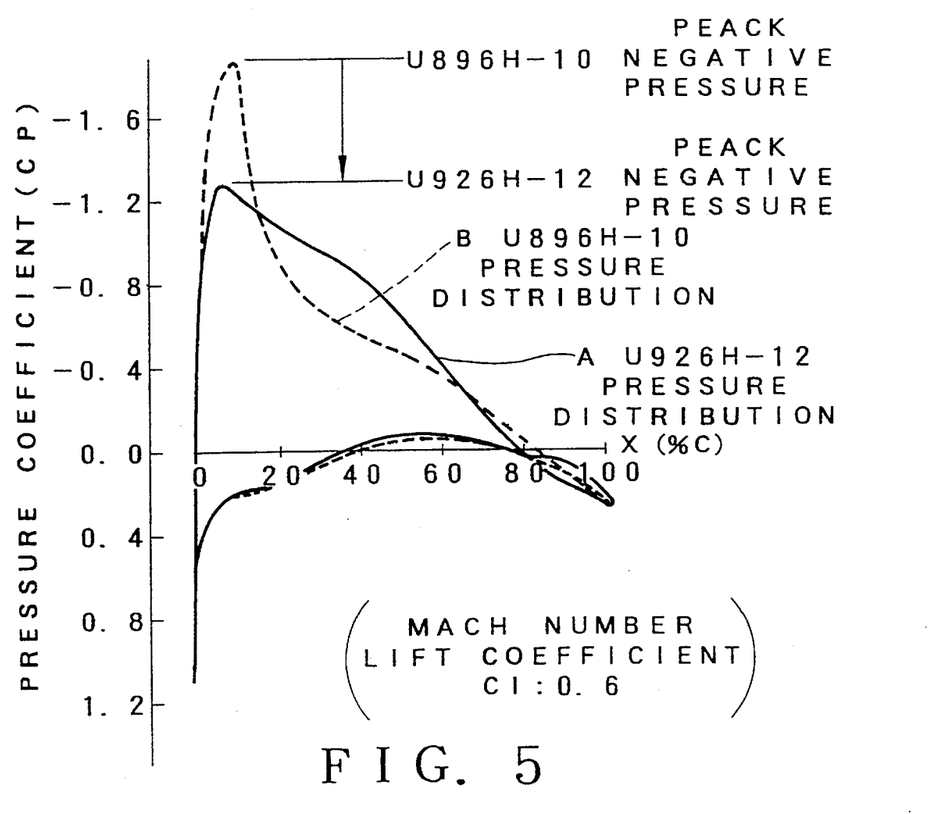
FIG. 5 is a graph showing pressure distributions on the airfoil section of the rotor blade in the first embodiment and on the airfoil section of a conventional rotor blade.

A estimated pressure distribution on the airfoil section U926H-12 when the Mach number is 0.6 and the lift coefficient is 0.6 is represented by a curve A in FIG. 5, in which a curve B represents a pressure distribution on the airfoil section U896H-10. As is obvious from the comparative observation of the curves A and B of FIG. 5, the peak of negative pressure appearing in the vicinity of the leading edge of the airfoil section U926H-12 is comparatively small. The reduction of the peak of the negative pressure in the vicinity of the leading edge reduces the drag that acts on the rotor blade when the Mach number is about 0.6 and the lift coefficient is about 0.6.

Figure 6:
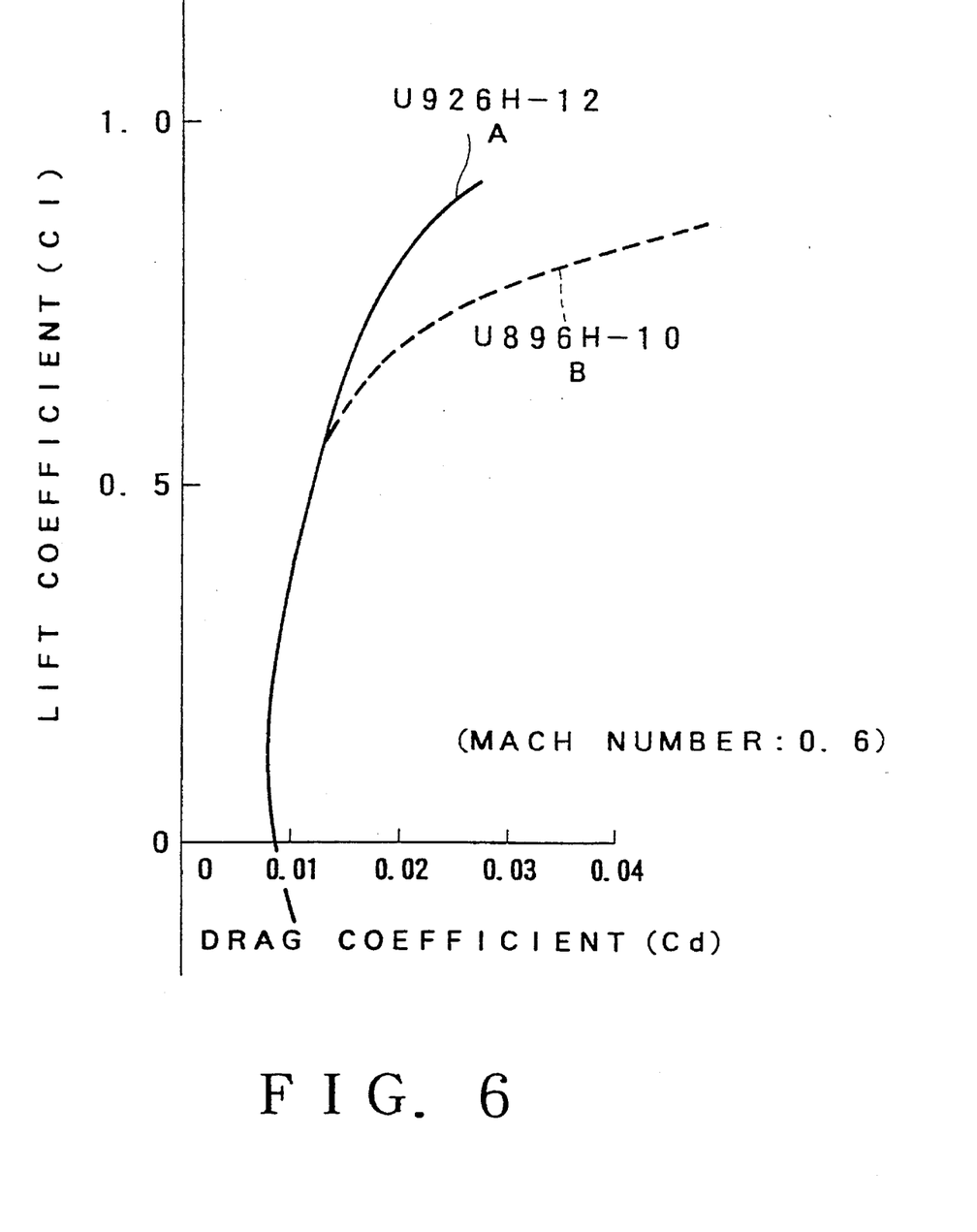
FIG. 6 is a graph showing the variation of the lift coefficient of the airfoil section of the rotor blade.

FIG. 6 is a graph showing a lift-drag characteristic curve A for the airfoil section U926H-12 of the rotor blade in this embodiment and a lift-drag characteristic curve B for the airfoil section U896H-10 proposed in the U.S. Pat. No. 5,344,102. In FIG. 6, lift coefficient $C_l$ is measured on the vertical axis, drag coefficient $C_d$ is measured on the horizontal axis and the Mach number is 0.6. As is obvious from FIG. 6, the airfoil section U926H-12 has a small drag coefficient, as compared with that of the known airfoil section U896H-10, when the Mach number is 0.6 and the lift coefficient is 0.6 or above.

Figure 7:
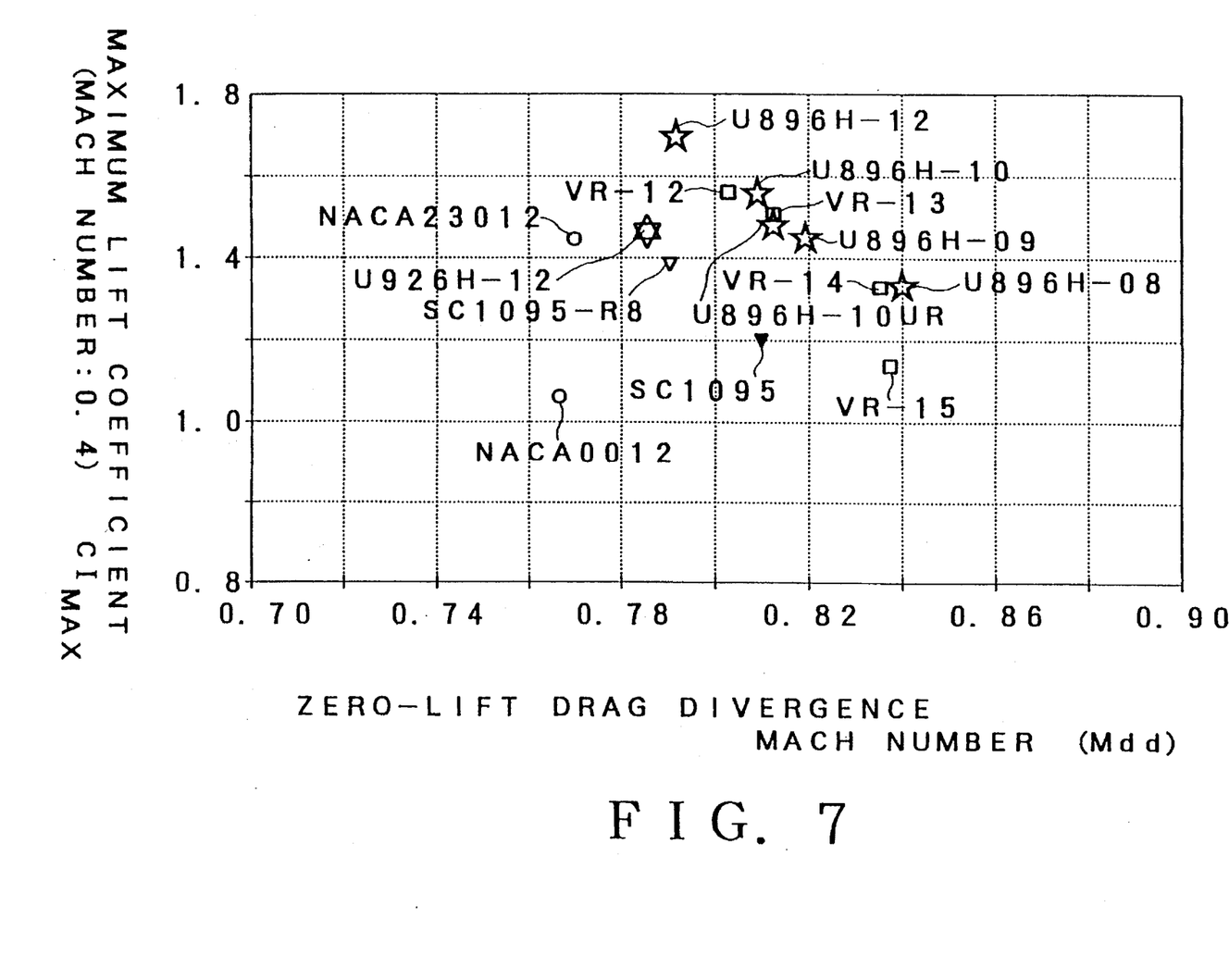
FIG. 7 is a graph showing a performance of the airfoil sections, in which maximum lift coefficient $C_{1max}$ at a Mach number of 0.4 is measured upward on the vertical axis and a zero-lift drag divergence Mach number $M_{dd}$ is measured to the right on the horizontal axis.

FIG. 7 shows the performance of the airfoil section NACA0012, NACA23012, the airfoil sections proposed in the U.S. Pat. No. 5,344,102 (U896H-10, U896-10UR, U896H-08, U896H-09 and U896H-12) and the airfoil section U926H-12 of the rotor blade in this embodiment, in which maximum lift coefficient $C_{lmax}$ when the Mach number is 0.4 is measured on the vertical axis and zero-lift drag divergence Mach number $M_{dd}$ is measured on the horizontal axis. As shown in FIG. 7, the maximum lift coefficient or the zero-lift drag divergence Mach number of the airfoil section U926H-12 is smaller than those of the airfoil sections proposed in the U.S. Pat. No. 5,344,102 and is larger than those of the airfoil sections NACA0012 and NACA23012. Thus, the airfoil section U926H-12 of the rotor blade in this embodiment has a comparatively large maximum lift coefficient and a comparatively large zero-lift drag divergence Mach number comparable to some extent to the large maximum lift coefficients and the large zero-lift drag divergence Mach numbers featuring the airfoil sections proposed in the U.S. Pat. No. 5,344,102. The small curvatures in a portion of the upper surface contiguous with the trailing edge, reduces the nose-down pitching moment to an extent on the order of the down pitching moment of the airfoil section U896H-10 proposed in the U.S. Pat. No. 5,344,102.

Figure 8:
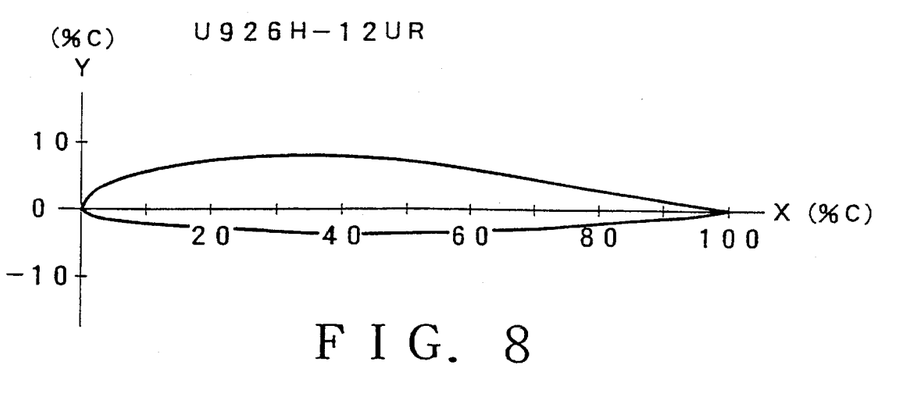
FIG. 8 is a graph showing the airfoil section of a rotor blade in a second embodiment according to the present invention.

FIG. 8 shows a section of a rotor blade of an airfoil section U926-12UR in a second embodiment according to the present invention. The shape of the portion of the airfoil section U926H-12UR between the leading edge and a point corresponding to a 95% chord length is the same as that of a corresponding portion of the airfoil section U926H-12. The trailing edge of the airfoil section U926H-12UR is raised by 0.321% (the ratio of an increment in $Y_U$ and $Y_L$ at 100% chord length to the chord length C) relative to the trailing edge of the airfoil section U926H-12 of the rotor blade in the first embodiment, whereby the pitching moment of the airfoil section U926H-12UR of the rotor blade in the second embodiment at a Mach number of 0.6 and under a zero-lift airflow condition is reduced substantially to zero. The basic thickness of the airfoil section U926H-12UR is at 12% chord length and the airfoil section U926H-12UR is represented by coordinates tabulated in Table 2.

Figure 9:
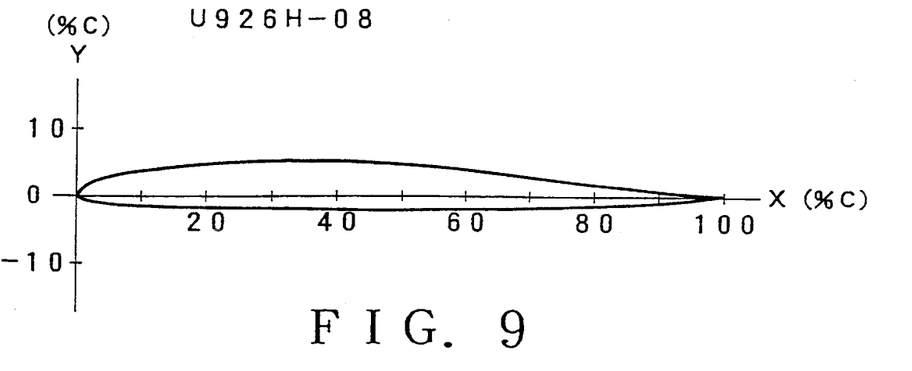
FIG. 9 is a graph showing the airfoil section of a rotor blade in a third embodiment according to the present invention.
Figure 10:
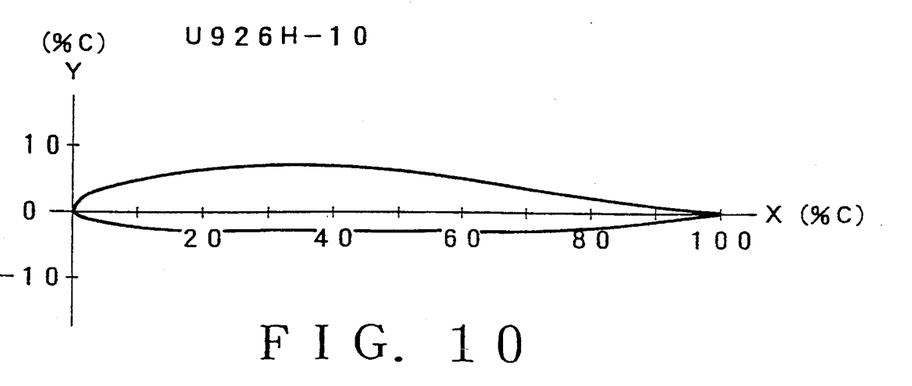
FIG. 10 is a graph showing the airfoil section of a rotor blade in a fourth embodiment according to the present invention.
Figure 11A:
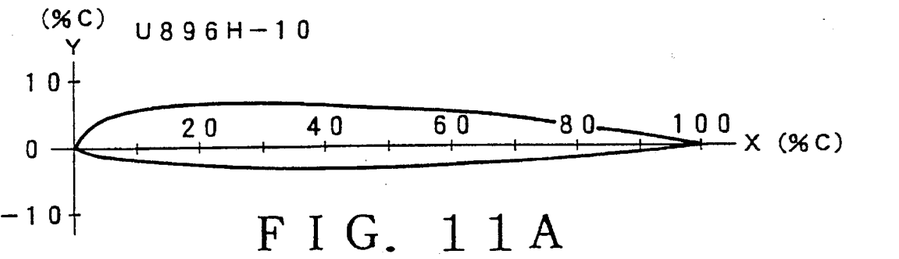
FIGS. 11(A), 11(B), 11(C), 11(D) and 11(E) are graphs showing the airfoil sections of conventional rotor blades, respectively.
Figure 11B:
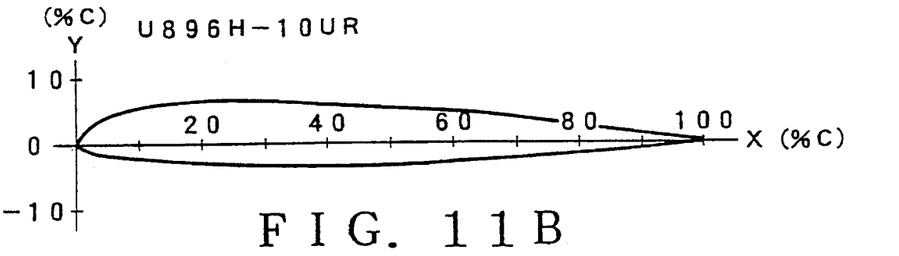
Figure 11C:
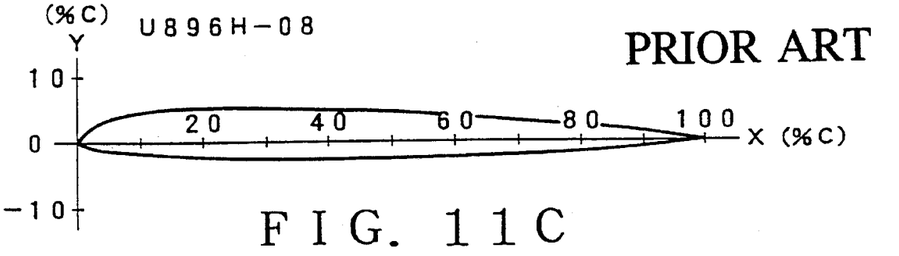
Figure 11D:
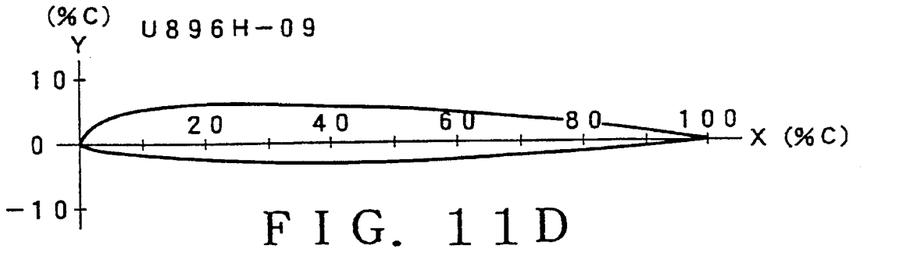
Figure 11E:
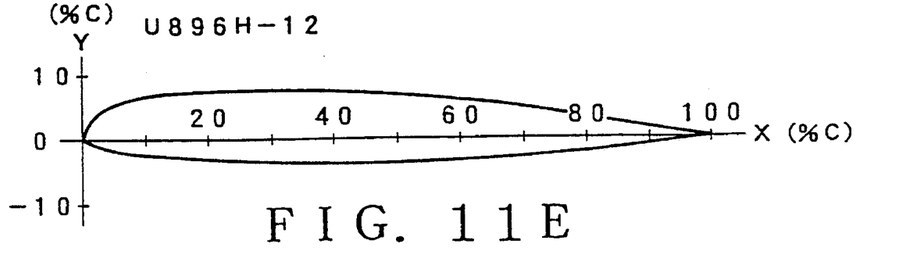

FIGS. 9 and 10 show sectional shape of a rotor blade of an airfoil section U926H-08 in a third embodiment and a rotor blade of an airfoil section U926H-10 in a fourth embodiment according to the present invention, respectively. The coordinates $Y_U$ and $Y_L$ of the airfoil sections U926H-08 and U926H-10 are determined by multiplying the corresponding $Y_U$ and $Y_L$ coordinates of the airfoil section U926H-12 of the rotor blade in the first embodiment by coefficients 8/12 and 10/12, respectively.

Portions contiguous with the trailing edges of the airfoil sections U926H-12, U926H12UR, U926H-08 and U926H-10 are cambered slightly (about 0.3% of the chord length for the airfoil section U926H-12UR) in upward concave shapes, respectively, to reduce the pitching moments substantially to zero or to make the airfoil sections generate an up pitching moment. If a certain measure of the nose-down pitching moment is permissible, the maximum lift coefficient of the airfoil section can be further increased by slightly lowering a portion of the airfoil section contiguous with the trailing edge.

Although the $Y_U$ and $Y_L$ coordinates of the airfoil sections U926H-08 and U926H-10 are determined by multiplying the corresponding $Y_U$ and $Y_L$ coordinates of the airfoil section U926H-12 by the coefficients 8/12 and 10/12, respectively, the coefficients are not limited thereto; the $Y_U$ and $Y_L$ coordinates of an airfoil sections with the same performance as that of the foregoing airfoil sections of the rotor blades embodying the present invention can be determined by multiplying the corresponding $Y_U$ and $Y_L$ coordinates of the airfoil section U926H-12UR by a coefficient of a value in the range of 5/12 to 15/12.

As is apparent from the foregoing description, the respective shapes of the lower surface and the trailing edge of the airfoil section of the rotor blade of the present invention are determined so as to secure a large zero-lift drag divergence Mach number and a large maximum lift coefficient, and the drag coefficient when the Mach number is about 0.6 and the lift coefficient is about 0.6 is reduced by shifting the position of the maximum blade thickness backward and concentrating the curvature distribution on the middle portion of the airfoil section.

An airfoil section that generates a substantially zero pitching moment or an airfoil section that generates up pitching moment can be readily formed by properly combining the principal portion of the aforesaid airfoil section in accordance with the present invention and the cambered portion contiguous with the trailing edge.

Furthermore, it is possible to obtain an airfoil section capable of providing the sections of a rotor blade for a rotary-wing aircraft at different radial positions with optimum performance and characteristics by slightly curving a portion of the airfoil section contiguous with the trailing edge upward or downward and properly adjusting the blade thickness by multiplying the $Y_U$ and $Y_L$ coordinates by a coefficient.

While the presently preferred embodiments of the present invention have been shown and described, it is to be understood that these disclosures are for the purpose of illustration and that various changes and modifications may be made without departing from the scope of the invention as set forth in the appended claims.

TABLE 1

| Upper surface | | Lower surface | |
|---|---|---|---|
| $X_u/$ $C \times 100(\%)$ | $Y_u/$ $C \times 100(\%)$ | $X_L/$ $C \times 100(\%)$ | $Y_L/$ $C \times 100(\%)$ |
| 0.000 | 0.000 | 0.000 | 0.000 |
| 0.150 | 0.939 | 0.150 | −0.391 |
| 0.500 | 1.600 | 0.500 | −0.668 |
| 1.250 | 2.457 | 1.250 | −0.968 |
| 2.500 | 3.357 | 2.500 | −1.276 |
| 5.000 | 4.577 | 5.000 | −1.670 |
| 7.500 | 5.420 | 7.500 | −1.953 |
| 10.000 | 6.060 | 10.000 | −2.162 |
| 15.000 | 6.995 | 15.000 | −2.469 |
| 20.000 | 7.631 | 20.000 | −2.754 |
| 30.000 | 8.299 | 30.000 | −3.328 |
| 40.000 | 8.306 | 40.000 | −3.689 |
| 50.000 | 7.663 | 50.000 | −3.775 |
| 60.000 | 6.428 | 60.000 | −3.550 |
| 70.000 | 4.828 | 70.000 | −3.018 |
| 80.000 | 3.084 | 80.000 | −2.238 |
| 90.000 | 1.411 | 90.000 | −1.379 |
| 95.000 | 0.692 | 95.000 | −0.838 |
| 100.000 | 0.150 | 100.000 | −0.150 |

TABLE 2

| Upper surface | | Lower surface | |
|---|---|---|---|
| $X_u/$ $C \times 100(\%)$ | $Y_u/$ $C \times 100(\%)$ | $X_L/$ $C \times 100(\%)$ | $Y_L/$ $C \times 100(\%)$ |
| 0.000 | 0.000 | 0.000 | 0.000 |
| 0.150 | 0.939 | 0.150 | −0.391 |
| 0.500 | 1.600 | 0.500 | −0.668 |
| 1.250 | 2.457 | 1.250 | −0.968 |
| 2.500 | 3.357 | 2.500 | −1.276 |
| 5.000 | 4.577 | 5.000 | −1.670 |
| 7.500 | 5.420 | 7.500 | −1.953 |
| 10.000 | 6.060 | 10.000 | −2.162 |
| 15.000 | 6.995 | 15.000 | −2.469 |
| 20.000 | 7.631 | 20.000 | −2.754 |
| 30.000 | 8.299 | 30.000 | −3.328 |
| 40.000 | 8.306 | 40.000 | −3.689 |
| 50.000 | 7.663 | 50.000 | −3.775 |
| 60.000 | 6.428 | 60.000 | −3.550 |
| 70.000 | 4.828 | 70.000 | −3.018 |
| 80.000 | 3.084 | 80.000 | −2.238 |
| 90.000 | 1.411 | 90.000 | −1.379 |
| 95.000 | 0.692 | 95.000 | −0.838 |
| 100.000 | 0.471 | 100.000 | 0.171 |

What is claimed is:

1. A rotor blade for a rotary-wing aircraft, having a blade thickness at 12% chord length and a portion between the leading edge and about 90% chord length defined by an airfoil section represented by coordinates:

| Upper surface | | Lower surface | |
|---|---|---|---|
| $X_u/$ $C \times 100(\%)$ | $Y_u/$ $C \times 100(\%)$ | $X_L/$ $C \times 100(\%)$ | $Y_L/$ $C \times 100(\%)$ |
| 0.000 | 0.000 | 0.000 | 0.000 |
| 0.150 | 0.939 | 0.150 | −0.391 |
| 0.500 | 1.600 | 0.500 | −0.668 |
| 1.150 | 2.457 | 1.250 | −0.968 |
| 2.500 | 3.357 | 2.500 | −1.276 |
| 5.000 | 4.577 | 5.000 | −1.670 |
| 7.500 | 5.420 | 7.500 | −1.953 |
| 10.000 | 6.060 | 10.000 | −2.162 |
| 15.000 | 6.995 | 15.000 | −2.469 |
| 20.000 | 7.631 | 20.000 | −2.754 |
| 30.000 | 8.299 | 30.000 | −3.328 |
| 40.000 | 8.306 | 40.000 | −3.689 |
| 50.000 | 7.663 | 50.000 | −3.775 |
| 60.000 | 6.428 | 60.000 | −3.550 |
| 70.000 | 4.828 | 70.000 | −3.018 |
| 80.000 | 3.084 | 80.000 | −2.238 |
| 90.000 | 1.411 | 90.000 | −1.379 | where $X_U$, $X_L$ represent the distances from the leading edge of the airfoil section along the chord, $Y_U$ represent the vertical distance from the chord to a point on the upper surface of the airfoil section, $Y_L$ represent the vertical distance from the chord to a point on the lower surface of the airfoil section.

2. The rotor blade for a rotary-wing aircraft, according to claim 1, where the blade includes means for reducing downward pitching moment and increasing maximum lift coefficient at about Mach 0.6.

3. The rotor blade for a rotary-wing aircraft, according to claim 1 where the performance of the airfoil section is optimized.

4. The rotor blade for a rotary-wing aircraft according to claim 1, wherein said blade thickness between about 95% and 100% of the chord length is represented by the following coordinates:

| Upper surface | | Lower surface | |
|---|---|---|---|
| $X_u/$ $C \times 100(\%)$ | $Y_u/$ $C \times 100(\%)$ | $X_L/$ $C \times 100(\%)$ | $Y_L/$ $C \times 100(\%)$ |
| 95.000 | 0.692 | 95.000 | −0.838 |
| 100.000 | 0.150 | 100.00 | −0.150 | where upper and lower surface lines are smoothly and continuously connected to each coordinate at said about 90.000% chord length; and said rotor blade has a trailing edge with an upwardly raised portion.

5. The rotor blade for a rotary-wing aircraft according to claim 1, where said rotor blade has a trailing edge and wherein said blade thickness between about 95% and 100% of the chord length is represented by the following coordinates:

| Upper surface | | Lower surface | |
|---|---|---|---|
| $X_u/C \times 100(\%)$ | $Y_u/C \times 100(\%)$ | $X_L/C \times 100(\%)$ | $Y_L/C \times 100(\%)$ |
| 95.000 | 0.692 | 95.000 | −0.838 |
| 100.000 | 0.471 | 100.00 | 0.171 | where upper and lower surface lines are smoothly and continuously connected to each coordinate at said about 90,000% chord length; and said trailing edge of said rotor blade has a further upwardly raised portion.

* * * * *